No. 827,706. PATENTED AUG. 7, 1906.
J. R. CALLAHAN.
COMBINED ROOST AND NEST SUPPORT.
APPLICATION FILED JAN. 2, 1906.

2 SHEETS—SHEET 1.

Witnesses
F. L. Ourand
S. C. Bryon.

Inventor
John R. Callahan

By R H McPeele
Attorney

No. 827,706. PATENTED AUG. 7, 1906.
J. R. CALLAHAN.
COMBINED ROOST AND NEST SUPPORT.
APPLICATION FILED JAN. 2, 1906.

2 SHEETS—SHEET 2.

UNITED STATES PATENT OFFICE.

JOHN R. CALLAHAN, OF SALEM, MISSOURI.

COMBINED ROOST AND NEST-SUPPORT.

No. 827,706.　　　　Specification of Letters Patent.　　　　Patented Aug. 7, 1906.

Application filed January 2, 1906. Serial No. 294,307.

*To all whom it may concern:*

Be it known that I, JOHN R. CALLAHAN, a citizen of the United States, residing at Salem, in the county of Dent and State of Missouri, have invented new and useful Improvements in a Combined Roost and Nest-Support, of which the following is a specification.

My invention relates to vermin-proof supports for poultry designed to be embodied in a poultry-roost or nest-support or in a combined roost and nest-support.

The object of the invention is to provide a device of this character which is particularly simple in construction and highly efficient in use and which is preferably made up of parts which may be readily separated from each other, so that the device may be readily transferred from place to place and easily set up in position when its destination is reached.

The invention includes the combination and arrangement of the component parts hereinafter described, and particularly pointed out in the claims.

The invention is susceptible of various embodiments; but in order to fully disclose the same it has been deemed necessary to illustrate and describe but one exemplification thereof.

Figure 1:
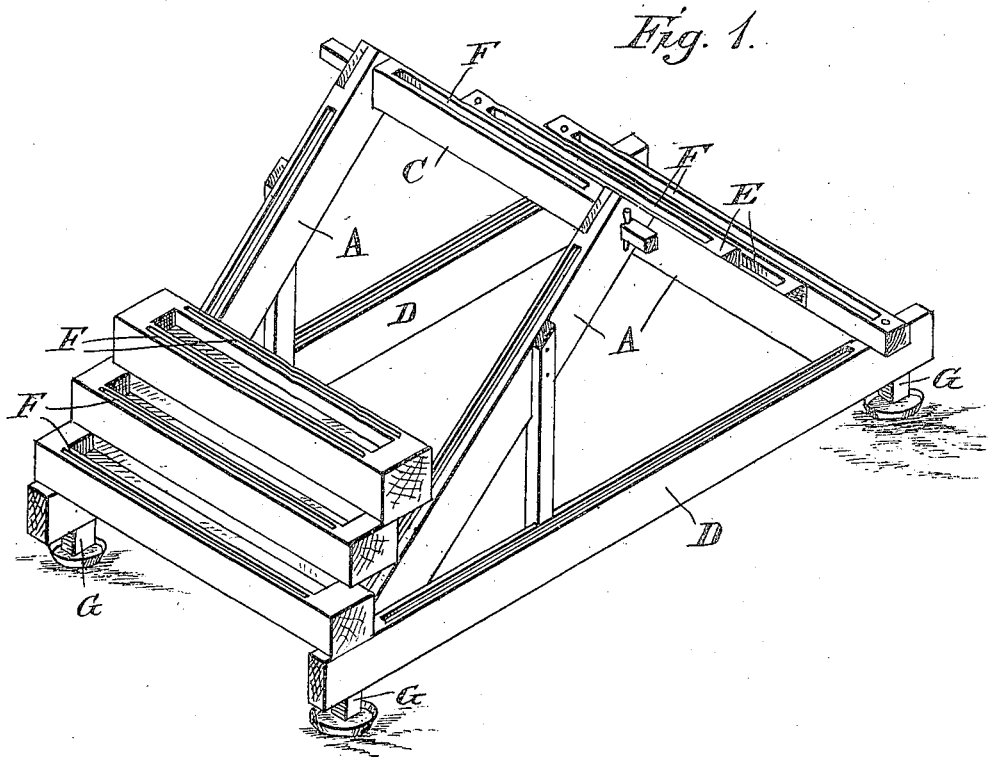
Figure 3:
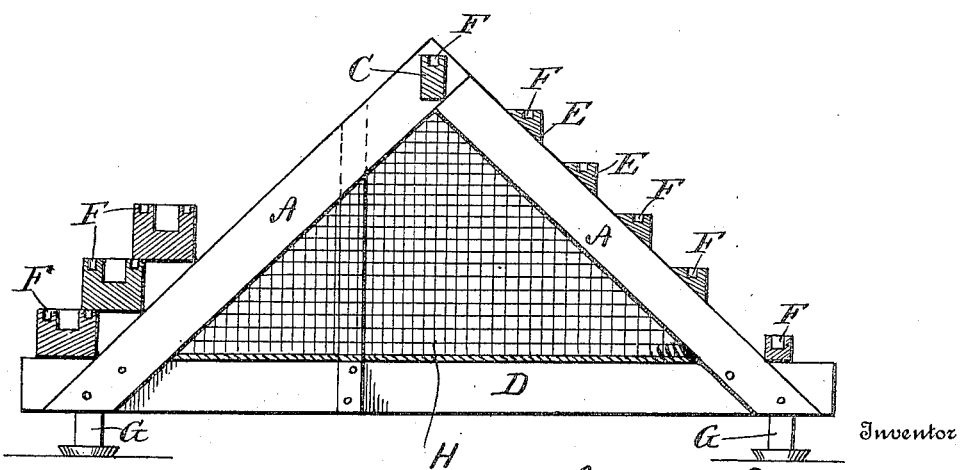
Figure 2:
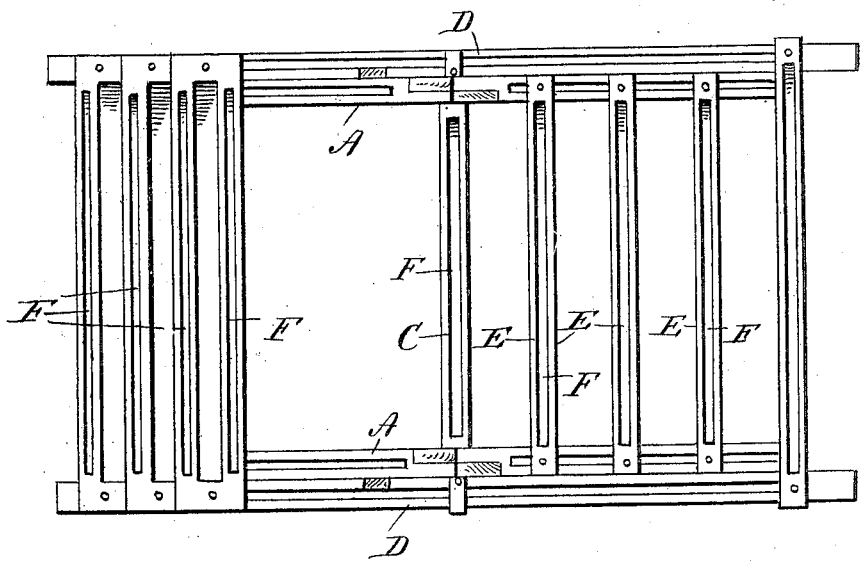
Figure 4:
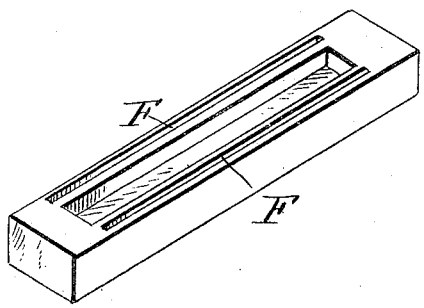

In the drawings, Figure 1 is a perspective view of a combined roost and nest-support with the side screens omitted. Fig. 2 is a plan view of the same. Fig. 3 is a vertical sectional view of a complete combined roost and support. Fig. 4 is a perspective view of a nest-box.

The invention includes generally a main frame and a series of supports secured thereto intended to provide either roosts or to be constructed in the form of nest-boxes, said supports being provided with channels or recesses to receive a suitable insecticide or vermin-exterminating medium, and the frame with its supports is intended to be isolated from the building in which it is inclosed in such a manner as to prevent vermin having access thereto except such as may be carried by the fowl.

The device preferably consists of a supporting-frame composed of the inclined side bars A, suitably connected in pairs at their upper ends, preferably by a rabbeted connection or other detachable joint. The pairs are preferably connected to each other and braced by a cross-piece C. The lower ends of the inclined members of each pair are connected to each other by horizontal-extending bars D. The supports which are secured to the frame may, as before premised, either consist of mere roosting-pieces or nest-boxes. These supports are indicated by E and are preferably secured upon the inclined faces of the bars A and are suitably spaced from one another. As will be particularly noted, the supports are provided in their upper faces with lengthwise-extending channels F, intended to provide pockets to receive a suitable insecticide. In the case of the nest-box these channels may be extended lengthwise of the upper edge of the front and rear walls of the box. The upper edges of the bars A, as well as the bars D, may also be provided with suitable recesses to receive insecticide.

In the illustrated exemplification of my invention one side of the supporting-frame is provided with a series of nest-boxes, while the other side of the frame is provided with a series of roost-supports. The nest-boxes are superimposed upon one another to the extent that the front lower edge of each superimposed box rests upon the rear wall of the box immediately therebeneath and the rear bottom edges of the boxes rest upon the support *a*. The roost-supports are secured to the frame independently of one another, with separating-spaces interposed.

The device is isolated from the building containing the same to the extent premised in some instances by suspending the device by wires or ropes from the roof or other portion of the building in which it is arranged and arranging receptacles on the suspending medium containing insecticide.

If the device is to rest upon the floor of the building in which it is placed, the frame may be held elevated above such floor by suitable legs or feet G, which are intended to rest within suitable vessels containing lime, wood ashes, or other like medium, which is intended to prevent the access of any vermin in the building to the frame.

If desired, a suitable flooring may be secured between the bars D, and the sides of the frame may be inclosed by a suitable screen H, so that an inclosure is provided for small chickens or the like.

My invention will be understood from the foregoing description, and it will be appreciated that changes may be made in the particular arrangement and proportion of the parts shown in the accompanying drawings without departing from the spirit and scope thereof.

I claim—

1. The combination with a substantially triangular-shaped supporting-frame, of a series of cross-bars arranged upon one side of the frame providing roosts, and a series of nest-boxes arranged on the opposite side of the frame, substantially as described.

2. The combination with a supporting-frame having two sets of downwardly and outwardly inclining side bars with recesses in their upper edges for the reception of a germicide, a plurality of nest-boxes extending transversely between the side bars of one set, said boxes having their upper side edges provided with recesses to receive a germicide and said boxes being superimposed upon one another to the extent that the lower front edges of the boxes rest upon the rear upper edges of the boxes immediately therebeneath and the rear lower edges of the boxes finding supports upon the inclined side bars aforesaid, and a series of supports extending transversely between and supported by the side bars of the second set, substantially as described.

3. The combination with a substantially triangular supporting-frame comprising two sets of downwardly and outwardly inclining side bars, supports extending transversely between the bars and secured thereto, a bottom fitted to the frame and screens secured to the side bars forming an inclosed receiving-space, substantially as described.

In testimony whereof I have signed my name to this specification in the presence of two subscribing witnesses.

JOHN R. CALLAHAN.

Witnesses:
J. D. GUSTIN,
FRANK C. PELLETT.